US008862126B2

(12) United States Patent
Edge et al.

(10) Patent No.: US 8,862,126 B2
(45) Date of Patent: Oct. 14, 2014

(54) SECURE USER PLANE LOCATION (SUPL) REDIRECTION AND MOBILE LOCATION PROTOCOL (MLP) TUNNELING TO A DISCOVERED SLP

(75) Inventors: Stephen William Edge, Escondido, CA (US); Andreas Klaus Wachter, Menlo Park, CA (US)

(73) Assignee: Qualcomm Incorporated, San Diego, CA (US)

( * ) Notice: Subject to any disclaimer, the term of this patent is extended or adjusted under 35 U.S.C. 154(b) by 72 days.

(21) Appl. No.: 13/592,268

(22) Filed: Aug. 22, 2012

(65) Prior Publication Data
US 2013/0217415 A1    Aug. 22, 2013

Related U.S. Application Data

(60) Provisional application No. 61/528,142, filed on Aug. 26, 2011.

(51) Int. Cl.
*H04W 4/02* (2009.01)
*H04W 64/00* (2009.01)
(52) U.S. Cl.
CPC .............. *H04W 64/00* (2013.01); *H04W 4/02* (2013.01)
USPC ............. 455/433; 455/435.1; 455/435.2; 455/456.2; 370/338; 370/395.2
(58) Field of Classification Search
CPC ............ H04W 8/02; H04W 8/04; H04W 8/24
USPC ............. 455/433, 435.1, 435.2, 456.1–456.4; 370/338, 395.2
See application file for complete search history.

(56) References Cited

U.S. PATENT DOCUMENTS 8,442,523 B2 * 5/2013 Shim ......................... 455/432.1
2006/0246919 A1 * 11/2006 Park et al. ................... 455/456.1
(Continued)

FOREIGN PATENT DOCUMENTS

KR    20090032054 A    3/2009
WO    2006104352 A1    10/2006
(Continued)

OTHER PUBLICATIONS

Open Mobile Alliance (OMA), "Location Working Group Efforts", Telcordia, Eu Emergency Services Workshop 2011, pp. 1-25 (Apr. 2011).

(Continued)

*Primary Examiner* — Kamran Afshar
*Assistant Examiner* — Farideh Madani
(74) *Attorney, Agent, or Firm* — Kilpatrick Townsend & Stockton LLP

(57) ABSTRACT

Systems and methods for Secure User Plane (SUPL) Redirection and Mobile Location Protocol (MLP) Tunneling to a Discovered SUPL Location Platform (D-SLP) are disclosed. For example, a method for SUPL redirection by a SET, may include: receiving an initiation message at a SET from a Home SUPL Location Platform (H-SLP); establishing a secure connection with the H-SLP, and returning a response message; receiving a redirect message from the H-SLP; establishing a SET initiated SUPL session with a D-SLP; obtaining a location of the SET using the D-SLP; and returning the location to the H-SLP.

18 Claims, 8 Drawing Sheets

(56) References Cited

U.S. PATENT DOCUMENTS

| | | | |
|---|---|---|---|
| 2007/0182547 A1 | 8/2007 | Wachter et al. | |
| 2007/0243885 A1 | 10/2007 | Shim | |
| 2009/0036142 A1* | 2/2009 | Yan | 455/456.1 |
| 2010/0311438 A1 | 12/2010 | Edge et al. | |
| 2011/0200022 A1* | 8/2011 | Annamalai | 370/338 |
| 2011/0249623 A1 | 10/2011 | Wachter et al. | |
| 2013/0273883 A1 | 10/2013 | D'Englere | |

FOREIGN PATENT DOCUMENTS

| | | |
|---|---|---|
| WO | 2007025143 A1 | 3/2007 |
| WO | 2007043772 A1 | 4/2007 |
| WO | 2007114629 A1 | 10/2007 |

OTHER PUBLICATIONS

Andreas, W., et al., "SUPL 3.0 Discovered SLP (D-SLP)", OMA, Open Mobile Alliance, Change Request OMA-LOC-2011-0031R01-INP_SUPL_3.0_Discovered_SLP_D_SLP, Mar. 17, 2011, pp. 1-10, XP002687193.

Andreas, W., et al., "SUPL3.0 TS ULP Generic SUPL Service", Internet Citation, Aug. 20, 2010, pp. 1-5, XP002668876. Retrieved from the Internet: URL:http://member.openmobilealliance.org/ftp/public documents/LOC/2010/0MA-LOC-2010-0210-CR SUPL_3.0_TS_ULP_Generic_SUPL_Service.zip.

Open Mobile Alliance : "Secure User Plane Location Architecture, Draft version 3.0", OMA-AD-SUPL-V3 0-20110819-D, Aug. 19, 2011, pp. 1-42, XP002687127, cited in the application Chapter 5.3.1.5; p. 21 Chapter 5.3.1.9; p. 24 Chapters B.6 and B.7; p. 36-p. 39.

Open Mobile Alliance: "User Plane Location Protocol, Draft Version 3.0 ", OMA-TS-ULP-V3_0-20110819-D, Aug. 19, 2011, pp. 1-272, XP002687249.

Partial International Search Report—PCT/US2012/052148—ISA/EPO—Dec. 5, 2012.

Tcs Systems: "SLP Discovery Models and Mechanisms", Dec. 15, 2010, pp. 1-11, XP55026932, Retrieved from the Internet: URL:http://member.openmobilealliance.org/ftp/Public documents/LOC/2010/OMA-LOC-2010-0316-INP_SUPL_3_0_TCS_SLP_Models_and_Discovery_Mechanisms.zip [retrieved on May 11, 2012] pp. 1-6, 10.

Wachter Andreas, Edge Stephen: "SUPL 3.0 Generic SUPL Session", OMA, Qualcomm, Aug. 20, 2010, XP002668873, Retrieved from the Internet: URL:http://member.openmobilealliance.org/ftp/public_documents/LOC/2010/OMA-LOC-2010-0209-INP_SUPL_3.0_Generic_SUPL_Session.zip [retrieved on Feb. 6, 2012] p. 1-p. 8.

International Search Report and Written Opinion—PCT/US2012/052148—ISA/EPO—Jun. 17, 2013.

* cited by examiner

SECURE USER PLANE LOCATION (SUPL) REDIRECTION AND MOBILE LOCATION PROTOCOL (MLP) TUNNELING TO A DISCOVERED SLP

CROSS REFERENCE TO RELATED APPLICATIONS

This patent application claims priority to U.S. Provisional Application No. 61/528,142, titled "Systems and Methods for Secure User Plane Location (SUPL) Redirection and Mobile Location Protocol (MLP) Tunneling to a Discovered SLP," filed on Aug. 26, 2011, the entirety of which is hereby incorporated by reference.

FIELD OF THE INVENTION

The present invention generally relates to location determination, for example using Secure User Plan Location (SUPL), and to use of a Discovered SUPL Location Platform (D-SLP). For example, embodiments described herein may include Secure User Plane Redirection and Mobile Location Protocol Tunneling to a D-SLP.

BACKGROUND

Mobile devices, such as mobile phones, notebook, computers, etc., typically have the ability to estimate their location and/or position using any one of several technologies such as, for example, satellite positioning systems (SPSs)—e.g., GPS, Galileo, Glonass and the like, advanced forward link trilateration (AFLT), Observed Time Difference Of Arrival (OTDOA), Cell ID or Enhanced Cell ID (ECID). Location or position estimation techniques typically involve the processing of measurements which may be based on signals acquired at a mobile device receiver. For example, a mobile device may acquire SPS signals or pilot signals transmitted from a terrestrial base station. Various measured characteristics of the acquired signals such as phase, signal strength, time of arrival, and/or round trip delay may be used in computing a position fix.

In a particular implementation, User Plane (UP) positioning such as SUPL (Secure User Plane Location) as set forth by the Open Mobile Alliance (OMA) is a amework within which location estimates obtained at a mobile device (e.g. a SUPL Enabled Terminal (SET)) or at a separate location server (e.g. SUPL Location Platform (SLP)) may be made available to other entities as part of a location service. Making these location estimates available to other entities (e.g. an external client such as a SUPL Agent) may be useful in particular applications such as, for example, providing emergency services, locating a user on behalf of another client user, obtaining driving directions or finding a nearby gas station, hotel, airport or hospital. Additionally, in certain instances a mobile device may also communicate with an SLP to obtain positioning assistance data such as, for example, a rough location, accurate time reference, data to assist in acquisition of SPS or terrestrial radio signals, local indoor navigation assistance data, SPS ephemeris data to assist in computing a location from SPS measurements. A location estimate may be referred to as a location, estimated location, position or position estimate—these terms being used synonymously herein.

In the case that an external SUPL Agent needs the location of a SET, the SUPL Agent would typically send a location request to the Home SLP (H-SLP) for the SET which would then instigate a SUPL session with the SET to obtain the SET's location after which the H-SLP would return the obtained location to the SUPL Agent. When a SET (SUPL enabled terminal) such as a mobile device is not served either by the home network or by a network with properties known to the SET's H-SLP (home SUPL location platform), however, it may not be possible for the H-SLP to obtain an accurate location for the SET or for the SET to obtain its own location accurately by engaging in a SUPL (Secure User Plane Location) session with the H-SLP.

SUMMARY

Embodiments of the present invention provide systems and methods for Secure User Plane Redirection and Mobile Location Protocol Tunneling to a Discovered SLP (D-SLP). For example, in one embodiment, a method for processing an MLP request, comprises: receiving, at an H-SLP, an MLP request to locate a SET; determining to utilize a first D-SLP to locate the SET; and transmitting the MLP request from the H-SLP to the first D-SLP.

In a further embodiment, a system for processing an MLP request comprises: an SLP comprising: a receiver configured to receive an MLP request to locate a SET; a processer configured to: determine to utilize a first D-SLP to locate the SET; and a transmitter configured to transmit the MLP request to the first D-SLP.

These illustrative embodiments are mentioned not to limit or define the invention, but to provide examples to aid understanding thereof. Illustrative embodiments are discussed in the Detailed Description, and further description of the invention is provided there. Advantages offered by various embodiments may be further understood by examining this specification.

DETAILED DESCRIPTION

Figure 1:
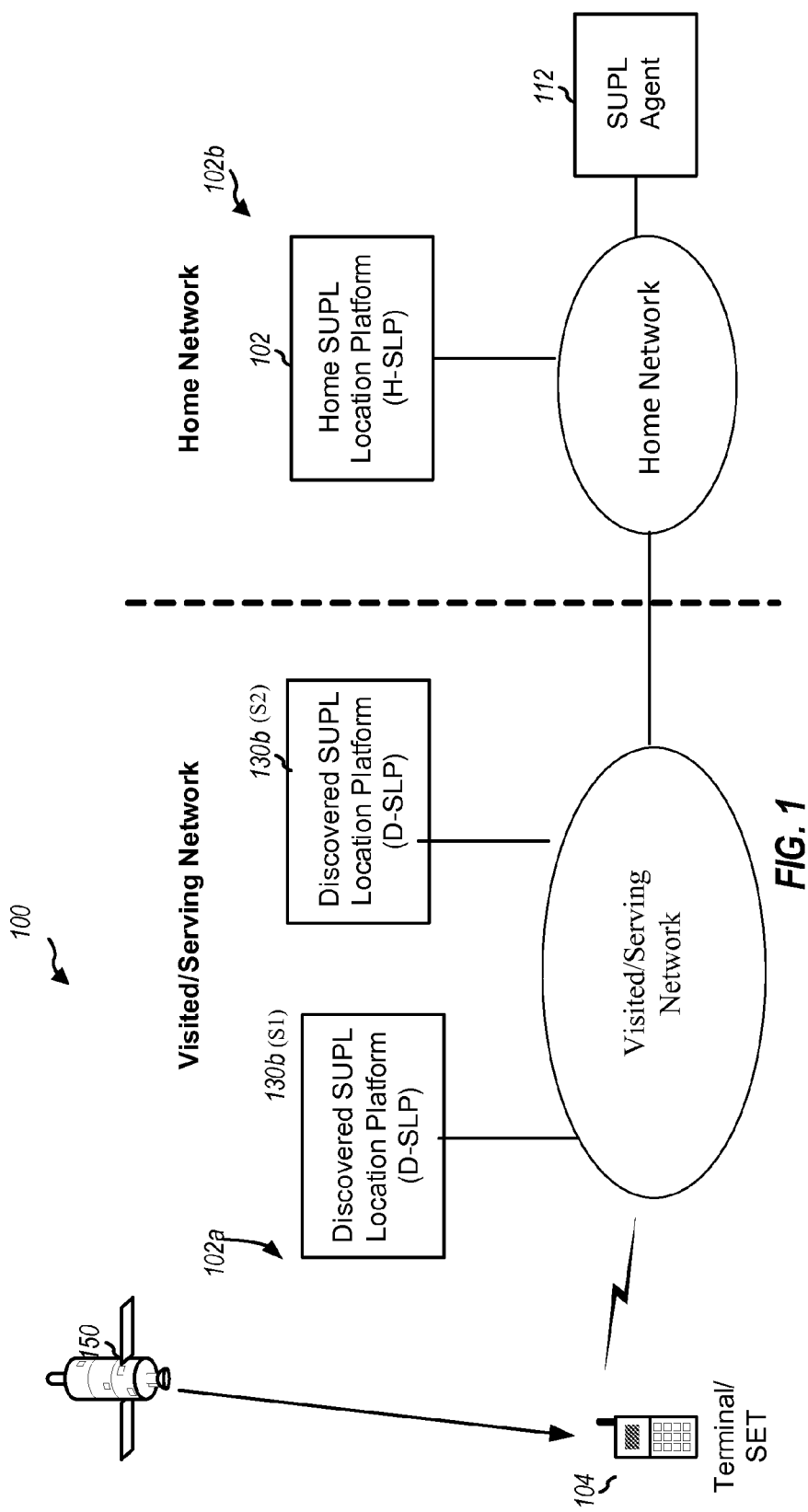
FIG. 1 is a system diagram describing an exemplary embodiment of a SUPL Architecture.

As an initial matter, the following abbreviations will be used throughout this application with the given meanings:

| | | |
|---|---|---|
| SUPL | Secure User Plane Location | A location solution defined by OMA that uses established data-bearing channels and separate positioning protocols for the exchange of location data between a SUPL Enabled Terminal (SET) and a SUPL Location Platform (SLP). SUPL is a key enabling technology for Location-Based |

| | | |
|---|---|---|
| SET | SUPL Enabled Terminal | Services (LBS). For example, some embodiments of the present disclosure may be implemented using SUPL version 3.0.<br>A device that can communicate with a SUPL server (SLP). Communication with the SLP is handled by SUPL supporting software running on the device. A SET could be a mobile phone, wireless PDA, PC, or any other device that can connect wirelessly or by wireline means to an IP network. |
| SUPL Agent | Secure User Plane Location Agent | Software or hardware entity that accesses an SLP or a SET to obtain location information applicable to a SET. |
| SLP | SUPL Location Platform | A server that provides positions or position assistance data to a SET, provides location information for a SET to a SUPL Agent and may also support functions related to roaming, security, authentication, charging, and more. |
| H-SLP | Home SLP | The SLP to which a SET user is permanently subscribed for location services and that is typically part of the user's home wireless network. |
| D-SLP | Discovered SLP | An SLP discovered or provided to a SET that is typically outside of a user's home wireless network. |
| MLP | Mobile Location Protocol | An application-level protocol defined by OMA for sending and receiving the location information of a mobile device such as a mobile phone or wireless PDA. MLP is the data interface used between SUPL providers, or between a SUPL Agent and an SLP. |
| ULP | User Plane Location Protocol | A protocol defined by OMA that supports the exchange of location related data between a SET and an SLP. In addition to location data, ULP also handles the exchange of authentication data. ULP is transported using TCP/IP and is part of SUPL. |
| UDP | User Datagram Protocol | A transport layer protocol defined by IETF (Internet Engineering Task Force) and making use of IP transfer. |
| SLIR | Standard Location Immediate Request | The MLP message used to request the location of a mobile device (e.g. a SET). The SLIR message may contain an ID of the targeted mobile device, an access code for obtaining the position of the mobile device, quality of position (QoP) and positioning priority, the ID of the service or application that is requesting the position of the mobile device, and additional information. |
| SLIA | Standard Location Immediate Answer | The MLP message sent in response to an SLIR message. The SLIA message may contain a unique ID number for the request, the ID of the targeted mobile device, the position of the mobile device, the time at which the position was calculated, and additional information. |
| RLP | Roaming Location Protocol | A protocol defined by OMA that serves as the interface between two location servers. In the context of SUPL, RLP would be used in communications between 2 SLPs - e.g. might be used between an H-SLP and a D-SLP. RLP adheres to Mobile Location Protocol (MLP) structure. |
| GPS | Global Positioning System | A system used to determine the location of a device (e.g. mobile device or SET) using orbiting GPS satellites. |
| AGPS | Assisted GPS | A method of GPS positioning whereby the GPS receiver is assisted in acquiring satellites and calculating positions by getting GPS ephemeris and other GPS related assistance data through a means other than directly from the GPS satellites - e.g. from an SLP using the ULP protocol or using a positioning protocol carried within ULP messages. |
| QoP | Quality of Position | The required level of accuracy and response delay associated with a location request. |
| LCS | Location Services | A generic term for services and related applications that are based on the geographic or civic location of a mobile device, and may be channeled through wireless communication networks. |

Traditional GPS receivers work best in open areas that offer an unobstructed line of sight to the GPS satellites orbiting overhead. In places where GPS signals are weak, obstructed, or scattered, as is the case inside a building, building complex, subway or in an urban canyon, traditional GPS receivers compute positions intermittently at best and frequently cannot compute positions at all. AGPS technology can deliver positions in some, though not all, places where traditional GPS receivers fail.

SUPL is a location solution that can enable use of AGPS and other positioning methods such as AFLT, OTDOA and ECID that was developed by the Open Mobile Alliance (OMA). The SUPL architecture is composed of two basic elements: a SUPL Enabled Terminal (SET) and a SUPL Location Platform (SLP). The SET is a mobile device, such as a phone, PDA, tablet computer, or other device, which has been configured to support SUPL transactions. The SLP is a server or network equipment stack that handles tasks associated with user authentication, location requests, provision of location assistance data, location-based application downloads, charging, and roaming.

A strength of SUPL is the utilization of existing positioning protocols, IP connections, and data-bearing channels. SUPL supports positioning protocols developed for the exchange of location data between a mobile device and a location server, including LTE Positioning Protocol (LPP), LPP Extensions (LPPe), Radio Resource Location Protocol (RRLP) and TIA-801. LPP and RRLP are defined by the $3^{rd}$ Generation Partnership Project (3GPP), LPPe is defined by OMA and TIA-801 is defined by the $3^{rd}$ Generation Partnership Project 2 (3GPP2)—all in publicly available documents. The LPPe protocol is an extension of the LPP protocol with LPP normally being used by SUPL either by itself or in combination with LPPe. SUPL also allows use of MLP and RLP and defines ULP for communication between a SET and SLP. MLP is used in the exchange of location based services data between elements such as an SLP and a SUPL Agent; RLP is used between two SLPs; ULP is used in the exchange of location data between an SLP and a SET.

In some embodiments, an external client may comprise a SUPL Agent. A SUPL Agent may indirectly acquire an estimated location of a SET from the mobile device. For example, to acquire an estimated location of a mobile device, a SUPL Agent may transmit a message to an SLP requesting the estimated location. After receiving the message from the SUPL Agent, the SLP may initiate a SUPL session with the mobile device to obtain an estimated location of the mobile device, which may subsequently be transmitted from the SLP to the SUPL Agent. The estimated location may be obtained in a plurality of ways. Two example ways include (i) where the mobile device makes measurements (e.g. of SPS signals and/or terrestrial radio signals from nearby base stations and/or other wireless access points) and transfers the measurements to the SLP for the SLP to compute the estimated location; and (ii) where the mobile device makes measurements as in (i) and in addition computes the estimated location itself, possibly making use of assistance data (e.g. SPS ephemeris data) provided by the SLP in order to do this.

In one embodiment, a mobile device may be associated with a home location server such as a home SLP (H-SLP) having location assistance data that is generally applicable to regions where the user device may be located at any particular time. Here, regardless of a current location of the mobile device, the mobile device may communicate with its H-SLP to obtain various location services, positioning assistance data, location based service information, etc.

In certain situations, however, an H-SLP may not have a particular location service and/or certain desired positioning assistance data, etc., for a mobile device to use in obtaining navigation assistance. For example, if the mobile device is located inside a building structure such as a shopping mall, airport, civic center or hospital, the H-SLP may be able to provide assistance data related to nearby base stations external to the building structure and to certain SPSs, but may not have information on wireless access points inside the building structure such as Wireless LAN Access Points or Femtocells. In that case, it may not be possible to obtain an accurate location estimate for the mobile device—e.g. if the mobile device can measure signals from the wireless access points inside the building structure but due to signal attenuation and reflection caused by the building structure, is unable to measure or accurately measure signals from SPS satellites and external base stations. In certain other cases, the H-SLP may not know about base stations nearby to the mobile device (e.g. if the mobile device is in a country or region remote from the H-SLP), making location estimation difficult or impossible even when the mobile device is outdoors and not within a building structure. In these cases, it may be beneficial for a SET or SUPL Agent to obtain location services from a D-SLP that may be more local to the SET than the SET's H-SLP and that may have more information on the SET's local environment (e.g. on nearby base stations and WiFi access points). A SET may discover a suitable D-SLP by itself and obtain authorization to use the D-SLP from its H-SLP or the SET may ask its H-SLP to provide the identity of a suitable D-SLP appropriate to the SET's current location. Thus, in certain situations (e.g. when a SET is roaming outside of its home network), the SET may access a D-SLP that has been discovered by the SET or by the SET's H-SLP and subsequently authorized for use by the H-SLP. In this situation, it may be better to obtain the SET's location using the D-SLP—e.g. because the D-SLP can obtain a more accurate and reliable location than the H-SLP. But the SUPL Agent may not be aware of the D-SLP or have a subscription to obtain location services from the D-SLP. Thus, it may be beneficial to enable a SUPL Agent to obtain location services from a D-SLP in a manner that does not require the SUPL Agent to discover a D-SLP itself or have a subscription for location services with the D-SLP provider.

In order to enable a SET to receive better location services when roaming away from its home network and allow SUPL Agents to obtain more accurate and reliable location of the SET, SUPL (e.g. SUPL version 3.0) allows the use of a D-SLP that may be discovered by a SET or provided to a SET by the SET's H-SLP. In both cases, the H-SLP also authorizes the SET to use the D-SLP. In some embodiments, an H-SLP may provide or authorize more than one D-SLP for a SET and may indicate conditions under which a SET is allowed to access a D-SLP. Examples of such conditions include some defined period of time during which a SET may access a specific D-SLP, a geographic service area in which a SET must be located in order to access a specific D-SLP and a set of one or more access networks, one of which a SET must be using in order to access a D-SLP. The possibility to provide or authorize more than one D-SLP to a SET combined with the conditions under which a SET may access any D-SLP means that an H-SLP may not always know which D-SLP a SET is currently using to obtain location services. However, SUPL enables a SET to send a report to its H-SLP whenever it starts accessing any D-SLP for the first time or for the first time after having accessed some other D-SLP. When this SUPL option is used, an H-SLP can know which D-SLP a SET is using at any time.

FIG. 1 shows a system diagram describing an exemplary embodiment of a SUPL Architecture 100. As shown in FIG. 1, an exemplary SUPL architecture may comprise: a GPS satellite 150, a SET 104, a visited/serving network 102*a*, one or more D-SLPs 130*b*, a home network 102*b*, a H-SLP 102 for SET 104, and a SUPL Agent 112.

As shown in FIG. 1, SET 104 may have a home network 102*b* but may, at any time, be using a different visited/serving network 102*a*. In some cases, when SET 104 is not roaming, the visited/serving network 102*a* and home network 102*b* may be the same network. Each of visited/serving network 102*a* and home network 102*b* may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, cdma2000 Evolution Data Only (EvDO), Wideband-CDMA (W-CDMA), Time Division Synchronous Code Division Multiple Access (TD-SCDMA), High Speed Packet Access (HSPA) to name just a few radio technologies. Here, cdma2000 may include technologies implemented according to Telecommunications Industry Association (TIA) IS-95, IS-2000, and IS-856 standards. A TDMA network may implement Global System for Mobile Communications (GSM), General Packet Radio Service (GPRS), Digital Advanced Mobile Phone System (D-AMPS), or some other RAT. GSM, GPRS, W-CDMA and HSPA are described in documents from 3GPP. Cdma2000 is described in documents from 3GPP and 3GPP2, which are publicly available. SET 104 may also access a local area network (LAN) (not shown in FIG. 1) which may support visited/serving network 102*a* or provide access to visited/serving network 102*a* or home network 102*b*. Examples of a LAN include an IEEE 802.11x wireless LAN (WLAN) network, and a Bluetooth network. Wireless communication networks used by visited/serving network 102*a* and home network 102*b* may also include so-called next generation technologies (e.g., "4G"), such as, for example, 3GPP Long Term Evolution (LTE), 3GPP LTE Advanced, IEEE 802.16 WiMAX, 3GPP2 Ultra Mobile Broadband (UMB), or other types of wireless communication networks.

SET 104 may correspond to a mobile device, such as a phone, PDA, tablet computer, or other device, which has been configured to support SUPL transactions. Interaction between SET 104 and H-SLP 102 or a D-SLP 130b is done through ULP (User Plane Location Protocol), which is a TCP/IP based protocol that can be used over GPRS, HSPA, LTE, CDMA EvDO, IEEE 802.11 WLAN or any other air interface approved for use in SUPL systems. SET 104 may further comprise LBS Applications and SUPL Agents. An LBS application may comprise any application that requests and uses location information, such as a navigation, tracking, or "friend-finder" application. SUPL Agent software is responsible for gaining access to the network resources required for the location session.

As shown in FIG. 1, one embodiment of an SLP architecture may comprise SUPL Agent 112. SUPL Agent 112 may comprise a software or hardware entity that accesses the SLP (e.g. H-SLP 102) to obtain location information for a SET—e.g. SET 104. For example, SUPL Agent 112 may comprise tracking software on a desktop that sends a location request to H-SLP 102 to determine the location of SET 104. In some embodiments, SET 104 may further comprise an internal SUPL Agent (not shown in FIG. 1). For example, in such an embodiment, the internal SUPL Agent may comprise a mobile GPS application on a mobile device.

Also shown in FIG. 1 is the H-SLP 102 for SET 104 which may be part of or accessed from the home network. FIG. 1 also shows two D-SLPs 130b that may be part of or accessed via the visited/serving network 102a. One or both D-SLPs 130b may be discovered by SET 104 while roaming in or nearby to the visited/serving network 102a or may be identified to SET 104 by the H-SLP 102. In either case, the H-SLP 102 may authorize SET 104 to obtain location services from one or both D-SLPs 130b and/or to accept a location request from one or both D-SLPs 130b to obtain the location of SET 104 and provide the location to some external client such as SUPL Agent 112. The H-SLP 102 may impose conditions under which SET 104 is allowed to access a D-SLP 130b to obtain location services. The conditions may include a period of time during which D-SLP 130b access is permitted, a geographic service area for a D-SLP 130b within which SET 104 must be located in order to access the D-SLP 130b and a set of access networks (e.g. visited/serving network 102a), one of which SET 104 must be using in order to access the D-SLP 130b. When SET 104 accesses a D-SLP 130b it may obtain location services such as requesting and receiving assistance data to enable SET 104 to make measurements associated with different position methods (e.g. AGPS, OTDOA, AFLT) and/or to enable SET 104 to compute its location from these measurements.

Under some circumstances, a D-SLP 130b may authorize and provide another D-SLP for SET 104. This may occur when SET 104 is in an area known to a discovered and authorized D-SLP 130b but not known to the SET 104's H-SLP 102. For example, in one embodiment, a SET may be roaming in another country where the SET's H-SLP is able to provide and authorize a D-SLP (S1) in this country that can provide location services in most parts of the country but is not able to provide adequate location services in certain restricted areas such in a certain shopping mall, airport, hospital etc. In this case, there may be another D-SLP (S2) that is able to provide better location services in the restricted area than the currently authorized D-SLP (S1), but this other D-SLP (S2) may not be known to the H-SLP. In this case, the H-SLP may authorize the initial D-SLP (S1) to act as a proxy for the H-SLP and provide and authorize other D-SLPs—such as D-SLP (S2). This capability is defined for example in SUPL version 3.0. In FIG. 1, one D-SLP 130b may be a proxy D-SLP provided and authorized by the H-SLP 120 while another D-SLP 130b may be provided and authorized by this proxy D-SLP 130b.

In FIG. 1, SUPL Agent 112 may normally access the H-SLP 102 when it wishes to obtain the location of SET 104. If SET 104 is not roaming or if the H-SLP 102 did not provide and authorize a D-SLP 130b for SET 104, H-SLP 102 may instigate a SUPL session with SET 104 and obtain the SET location using ULP or any of the positioning protocols supported within ULP, for example, such as RRLP, LPP, LPP plus LPPe or TIA-801. The H-SLP 102 may then return the SET 104 location to SUPL Agent 112. But if the H-SLP 102 has provided or authorized one or more D-SLPs 130b for SET 104, then the H-SLP 102 may be able to obtain a more accurate and reliable location using a provided or authorized D-SLP 130b as described further on herein.

Figure 2:
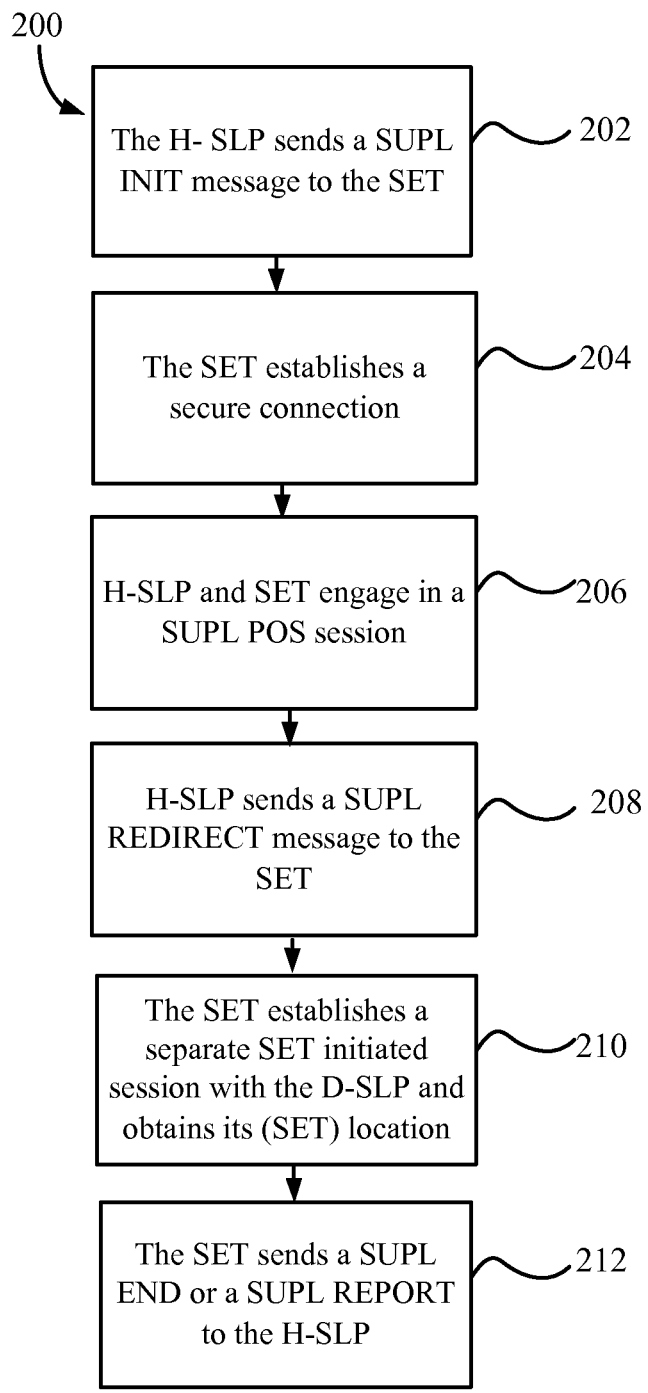
FIG. 2. is a flow chart describing an exemplary embodiment for use of a SUPL redirect.

FIG. 2 is a flow chart describing an exemplary embodiment for secure user plane redirect. In some embodiments, the steps in FIG. 2 may be implemented in program code that is executed by a processor, for example, the processor in a general purpose computer, a mobile device, or server. In some embodiments, these steps may be implemented by a group of processors, for example, a processor on a mobile device and processors on one or more general purpose computers, such as servers. For example, in some embodiments the steps in FIG. 5 may be performed by Processor 720, Memory 722, Software 724, Antenna(s) 728, and I/O Devices 726 of SET 712. In some embodiments, some of the steps may be performed by Processor 811 executing instructions 814 stored on memory 812 of one or more SUPL Servers 810 and using one or more transmitters, receivers, and antennas of one or more SUPL Servers 810 (not shown in FIG. 8).

As shown in FIG. 2, the method 200 starts at stage 202 when the H-SLP (such as SLP 810 shown in FIG. 8) sends a SUPL INIT message to the SET (e.g. SET 104 in FIG. 1). For example, in some embodiments, SLP 801 may determine this message using processor 811 and send it using a transmitter and antenna (not shown in FIG. 8). In some embodiments, SET 712 may receive the request using Antenna(s) 728. This step may be triggered when a SUPL Agent (e.g. SUPL Agent 112 in FIG. 1) sends a location request (e.g. via MLP) to the H-SLP to request the location of the SET, for example using Antenna(s) 728. In some embodiments, the SUPL INIT message is the first SUPL message sent to a SET by an SLP when instigating any SUPL session with a SET—e.g. to obtain the location of the SET. In some embodiments, the SUPL INIT message may comprise a new D-SLP related flag (e.g. as indicated using a new position method value) indicating that location via a D-SLP may be needed.

Next, at stage 204, the SET establishes a secure connection to the H-SLP. For example, in some embodiments, SET 712 may establish the secure connection using processor 720. In some embodiments, the SET may further return a SUPL POS INIT containing information about current D-SLPs that have been authorized for the SET by the H-SLP or by a proxy D-SLP if the SET has any proxy D-SLPs that have provided and authorized other D-SLPs. For example, in some embodiments, the SET 712 may return this message using processor 720 and Antenna(s) 728. For example, in one embodiment, the SUPL POS INIT may comprise a list of currently authorized D-SLPs and whether the SET is within the geographic service area of each of these D-SLPs. In other embodiments, the SUPL POS INIT may comprise an indication of whether the SET has any authorized D-SLPs and is within the geographic service area of at least one of them. In still other embodiments, the SUPL POS INIT could provide initial position measurements. For example, these initial position measurements may be based on the ECID, OTDOA or some other position method.

Then, at stage 206, the H-SLP and SET engage in a SUPL POS session in which the SET and H-SLP exchange SUPL POS messages each containing one or more messages supporting a positioning protocol such as LPP, LPP/LPPe, RRLP or TIA-801. For example, in some embodiments, SLP 801 may exchange messages using processor 811 and send it using a transmitter, receiver, and antenna (not shown in FIG. 8). In some embodiments, SET 720 may exchange messages using Antenna(s) 728. In some embodiments, the SUPL POS session may let the H-SLP get an approximate or even accurate location of the SET. In some embodiments, this stage can be omitted.

Next, at stage 208, the H-SLP sends a SUPL REDIRECT message to the SET. For example, in some embodiments, SLP 801 may determine this message using processor 811 and send it using a transmitter and antenna (not shown in FIG. 8). In some embodiments, the SET 712 may receive the SUPL REDIRECT using Antenna(s) 728. In some embodiments, the SUPL REDIRECT message may contain an authorized D-SLP address (e.g. the address of a D-SLP 130b in FIG. 1), a billing code and/or a digitally signed set of information (e.g. digitally signed authentication data) to enable a D-SLP to verify the identity of the SET and/or the identity of the H-SLP. The digitally signed information may include one or more of the billing code, the date and time, the SET identity and the H-SLP identity. In some embodiments, if no D-SLP address is provided, the SET can use any authorized D-SLP, if the SET is in that D-SLP's service area.

Then at stage 210, the SET establishes a separate SET initiated SUPL session with either the D-SLP provided in stage 208 or a D-SLP chosen by the SET if no D-SLP was provided. For example, in some embodiments, the SET 712 may determine a D-SLP by executing software 724 stored on memory 722 with processor 720. The D-SLP may, for example, be a D-SLP 130b shown in FIG. 1. The SET then obtains its (SET) location via SUPL interaction with the D-SLP and performing location measurements as directed by the D-SLP or as decided by the SET. In some embodiments, the SET provides the billing code and/or digitally signed information from stage 208 above to the D-SLP. For example, the SET 712 may send these messages using Antenna(s) 728. For example, the SET may provide the billing code and/or digitally signed information to the D-SLP in the SUPL START message. In some embodiments, this may ensure that the D-SLP operator will not bill the SET user for the location session, but will instead bill the H-SLP operator. In some embodiments, the D-SLP may use the digitally signed information to authenticate the identity of the SET and/or the identity of the H-SLP. In some embodiments, the H-SLP operator may pass on the charge to the SUPL Agent for which the location request in stage 202 was initiated.

At stage 212, the SET sends a SUPL END or a SUPL REPORT to the H-SLP with the location from stage 210. The SUPL session between the H-SLP and SET may then terminate—e.g. the H-SLP may send a SUPL END message to the SET if the SET did not send a SUPL END in stage 212. For example, in some embodiments, SLP 801 may determine this message using processor 811 and send it using a transmitter and antenna (not shown in FIG. 8). The SET 712 may receive these messages using Antenna(s) 728. However, other components discussed in FIG. 1 above may have additional stages. For example, in some embodiments, the client application in the SUPL Agent may continue to perform additional tasks.

Figure 3:
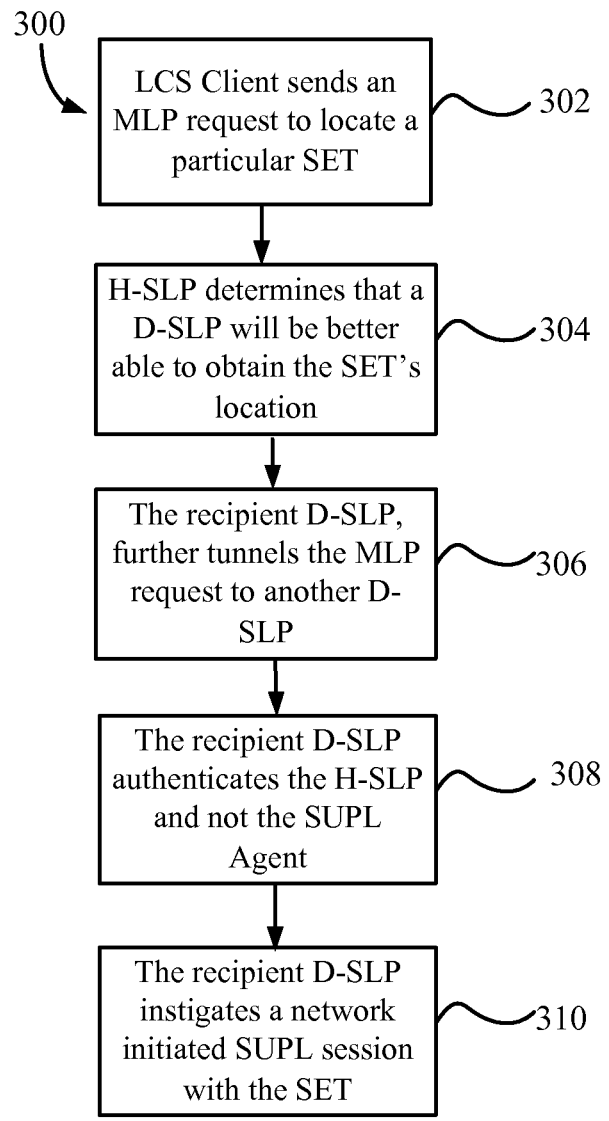
FIG. 3 is a flow chart describing an exemplary embodiment for use of MLP tunneling.

FIG. 3 is a flow chart describing an exemplary embodiment for use of MLP tunneling. In some embodiments, the stages in FIG. 3 may be implemented in program code that is executed by a processor, for example, the processor in a general purpose computer, a mobile device, or server. In some embodiments, these stages may be implemented by a group of processors, for example, a processor on a mobile device and processors on one or more general purpose computers, such as servers. For example, in some embodiments the steps in FIG. 5 may be performed by Processor 720, Memory 722, Software 724, Antenna(s) 728, and I/O Devices 726 of SET 712. In some embodiments, some of the steps may be performed by Processor 811 executing instructions 814 stored on memory 812 of one or more SUPL Servers 810 and using one or more transmitters, receivers, and antennas of one or more SUPL Servers 810 (not shown in FIG. 8).

As shown in FIG. 3, the method 300 starts at stage 302 when an LCS client (e.g. SUPL Agent 112 in FIG. 1) sends an MLP request to locate a particular SET (e.g. SET 104 in FIG. 1). For example, the SET 712 may receive these messages using Antenna(s) 728. In some embodiments, the LCS client sends the MLP request to the H-SLP (such as SLP 810 shown in FIG. 8) for the SET for which the location is needed (e.g. the LCS client sends the MLP request to H-SLP 102 in FIG. 1).

Next, at stage 304, the H-SLP determines that a D-SLP (e.g. a D-SLP 130b in FIG. 1) will be better able to obtain the SET's location. For example, in some embodiments, SLP 801 may determine this using processor 811. For example, the H-SLP may have previously provided and authorized one or more D-SLPs for the SET and/or may have received reports from the SET concerning recently accessed D-SLPs. For example, the SET 712 may send these reports using Antenna(s) 728. Consequently, the H-SLP may be aware that the SET is using a D-SLP that can provide better location support than the H-SLP. The H-SLP may also be able to determine which D-SLP is best able to locate the SET—e.g. from the D-SLP most recently reported by the SET as having been accessed or from a recent location for the SET obtained by the H-SLP, which is associated with a particular preferred D-SLP. In some embodiments, the H-SLP may therefore send the MLP request received in stage 302 to a preferred D-SLP. In some embodiments, the H-SLP may send this message by a process referred to herein as "tunneling." Tunneling uses a RLP tunneling capability to transfer a message without any change to that message. For example, in one embodiment, an RLP tunneling capability may be used to transfer the MLP Request message received in stage 302 without any change to the message. RLP is a protocol that serves as the interface between two location servers. In some embodiments, in the context of SUPL, RLP is used in communications between the H-SLP and a D-SLP. RLP adheres to Mobile Location Protocol (MLP) structure. In some embodiments, this RLP tunneling impacts the H-SLP, D-SLP and the RLP protocol but may be simpler than implementing the complete RLP protocol in both the H-SLP and D-SLP—thereby reducing impacts in comparison to translating the MLP request message received in stage 302 into an equivalent RLP message. In some embodiments, this RLP tunneling may be similar to proxy roaming support in SUPL 2.0 except that MLP messages would be tunneled and not ULP messages (thereby avoiding any impacts to SUPL and avoiding associated impacts to a SET).

Then, at stage 306, the recipient D-SLP, may further tunnel the MLP request to another D-SLP (e.g. another D-SLP 130b in FIG. 1). In some embodiments, this stage may occur if the D-SLP chosen in stage 304 is a proxy D-SLP and has previously provided or authorized another D-SLP to the SET. However, a proxy D-SLP may only tunnel the MLP request to a D-SLP that has already been authorized by the proxy D-SLP. In some embodiments, the tunneling messages in stages 304 and 306 may provide additional information about the SET which the H-SLP has but not the D-SLP. In some embodiments, stage 306 may not occur and stages 308 and 310 may be supported by the D-SLP chosen by the H-SLP in stage 304.

Next at stage 308, the recipient D-SLP authenticates the H-SLP and not the SUPL Agent. This authentication may be supported using secure IP (IPsec), TLS or authentication information provided within RLP. In some embodiments, the SUPL Agent is authenticated by the H-SLP. Similarly, in some embodiments, service authorization is performed only by the H-SLP and not by a D-SLP which may accept whatever service request is tunneled through by the H-SLP.

Then at stage 310, the recipient D-SLP may instigate a network initiated SUPL session with the SET to obtain its location. The D-SLP can notify the SET concerning the original LCS Client if the H-SLP included this information with the MLP Request tunneled to the D-SLP in stages 304 and 306. For example, the SET 712 may receive these messages using Antenna(s) 728. The SET can then decide whether or not to allow the location request. In some embodiments, the D-SLP will then return the location to the H-SLP in an MLP response. In some embodiments, if the Proxy D-SLP discussed in stage 306 was utilized, then the MLP response and SET location will be tunneled using RLP back via the Proxy D-SLP to the H-SLP.

Figure 4:
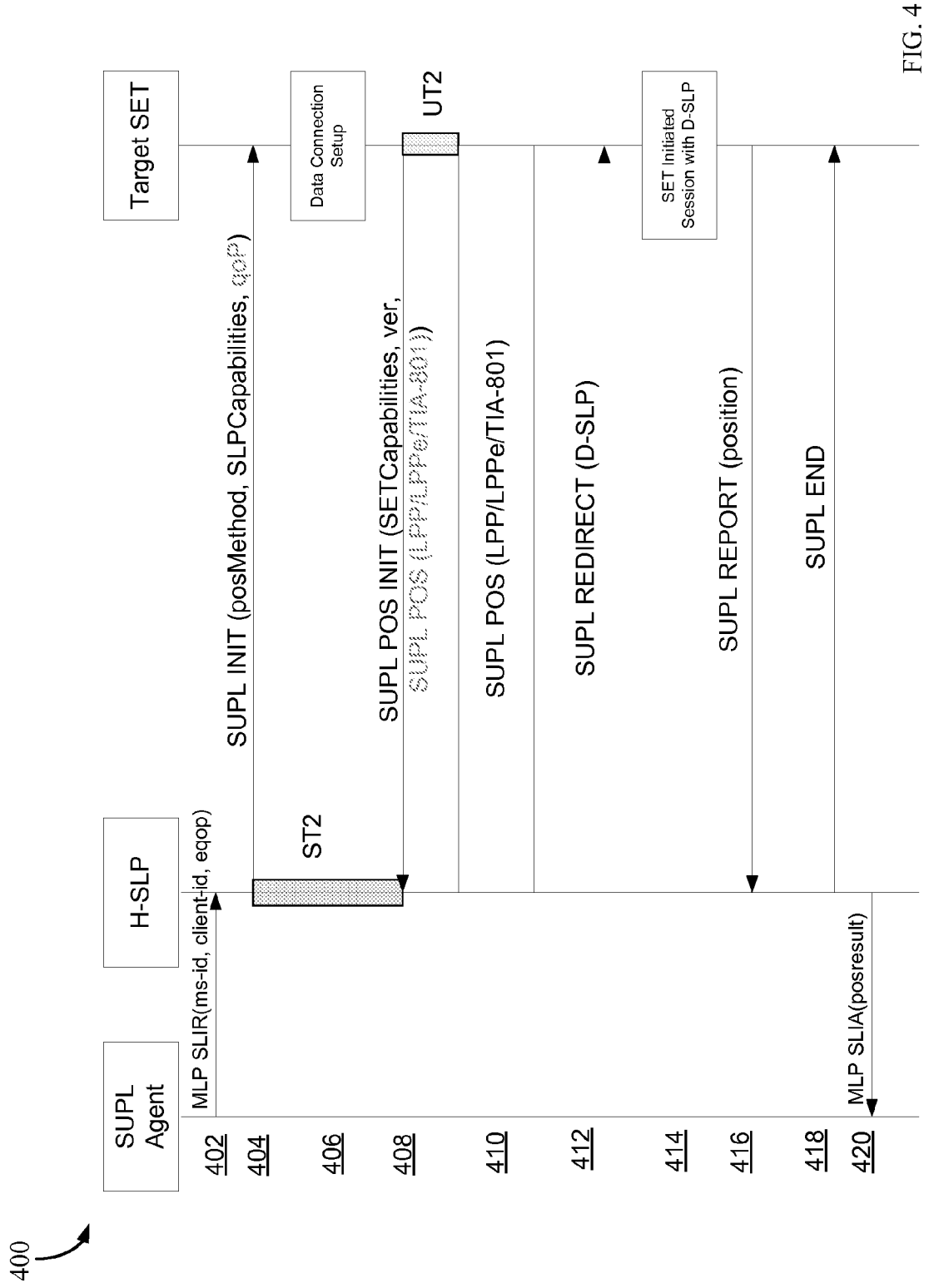
FIG. 4 is a flow diagram describing an example of a method for SUPL redirect for immediate location.

FIG. 4 is a flow diagram describing an example of a method for SUPL redirect for immediate location. The example provides further embodiments of the design described in FIG. 2. In some embodiments, the stages in FIG. 4 may be implemented in program code that is executed by a processor, for example, the processor in a general purpose computer or server. In some embodiments, these stages may be implemented by a group of processors, for example, a processor on a mobile device and processors on one or more general purpose computers, such as servers. For example, in some embodiments the steps in FIG. 5 may be performed by Processor 720, Memory 722, Software 724, Antenna(s) 728, and I/O Devices 726 of SET 712. In some embodiments, some of the steps may be performed by Processor 811 executing instructions 814 stored on memory 812 of one or more SUPL Servers 810 and using one or more transmitters, receivers, and antennas of one or more SUPL Servers 810 (not shown in FIG. 8).

As shown in FIG. 4, the method 400 starts at stage 402 when a SUPL Agent (e.g. SUPL Agent 112 in FIG. 1) sends an MLP SLIR message to the H-SLP (e.g. H-SLP 102 in FIG. 1 or SLP 810 shown in FIG. 8), with which it is associated to request the location of a particular SET (e.g. SET 104 in FIG. 1). Then the H-SLP will authenticate the identity (e.g. a client-id) of the SUPL Agent and check if the SUPL Agent is authorized for the service requested. In some embodiments, this authentication procedure is based on the client-id received from the SUPL Agent. The H-SLP may also provide privacy checking for the SET based on the SET identity (e.g. defined by an MLP ms-id parameter) and client-id. In some embodiments, the H-SLP may also verify that the target SET supports SUPL.

In some embodiments, if a previously computed position for the SET that meets the requested QoP (Quality of Position) is available at the H-SLP and no notification and verification by the SET is required, the H-SLP will directly proceed to stage 420. In other embodiments, if notification and verification or notification only is required, the H-SLP will proceed to stage 404.

Then, at stage 404, the H-SLP initiates the location session with the SET by sending the SUPL INIT message to the SET. For example, in some embodiments, SLP 801 may determine this message using processor 811 and send it using a transmitter and antenna (not shown in FIG. 8). For example, the SET 712 may receive this messages using Antenna(s) 728. The SUPL INIT message contains the intended positioning method (posMethod), the SLP Capabilities (sLPCapabilities) and optionally the QoP. In some embodiments, if the result of the privacy check in stage 402 indicates that notification and/or verification of the target subscriber is needed, the H-SLP also includes the Notification parameter in the SUPL INIT message. In some embodiments, before the SUPL INIT message is sent, the H-SLP also computes and stores the hash of the SUPL INIT message.

In some embodiments, if in stage 402 the H-SLP decided to use a previously computed position, the SUPL INIT message will indicate this in a 'no position' posMethod parameter value and the SET will respond with a SUPL END message carrying the results of the verification process (access granted or access denied). For example, in some embodiments, SLP 801 may make this determination using processor 811. In other embodiments, if no explicit verification is required (notification only) the SET will respond with a SUPL END message, and then H-SLP will proceed directly to stage 420. For example, the SET 712 may send these messages using Antenna(s) 728. But in such an embodiment, before sending the SUPL END message, the SET will perform the data connection setup procedure of stage 406 and use the procedures described in stage 408 to establish a TLS connection to the H-SLP.

Next, at stage 406, the SET analyzes the received SUPL INIT message. For example, the SET 712 may analyze the received message with processor 720. In some embodiments, if the SUPL INIT message is found to be not authentic, the SET takes no further action. In other embodiments, the SET takes required action to prepare for the establishment of a TLS connection with the H-SLP. In some embodiments, the SET also calculates the hash of the received SUPL INIT message.

Then at stage 408, the SET evaluates the Notification rules and takes the appropriate action—e.g. the SET may notify the SET user about the location request and may verify the user's willingness to allow the location request. For example, the SET 712 may evaluate the Notification rules using processor 720, and notify the user using one or more of I/O devices 726. The SET may then establish a TLS connection to the H-SLP using the H-SLP address provisioned in the SET by the home network (e.g. provisioned during SET manufacture). The SET and the H-SLP may authenticate one another during the establishment of the TLS connection. The SET then sends a SUPL POS INIT message to start a positioning session with the H-SLP. In some embodiments, the SET will send the SUPL POS INIT message even if the SET does not support the intended positioning method indicated in the SUPL INIT. The SUPL POS INIT message contains the SET capabilities (sETCapabilities) and the hash of the received SUPL INIT message calculated in stage 406. The SET capabilities may indicate that the SET supports a SUPL Redirect. The SUPL POS INIT message may include a list of authorized D-SLPs for the SET and an indication as to whether the SET is within the service area of any D-SLP or of a particular D-SLP. In some embodiments, the SUPL POS INIT message may also include a SUPL POS message carrying LPP/LPPe and/or TIA-801 positioning protocol messages in line with the H-SLP's positioning protocol capabilities (e.g. as indicated in stage 404 in sLPCapabilities). In some embodiments, the SET may also provide its position, if this is supported (as part of LPP/LPPe/TIA-801 or explicitly through the optional position parameter in the SUPL POS INIT). In some embodiments, if a position retrieved in, or calculated based on information received in the SUPL POS INIT message is available, and meets the required QoP, the H-SLP may directly proceed to stage 418 and not engage in a SUPL POS session.

Next, at stage 410, the SET and H-SLP engage in a SUPL POS message exchange to calculate a position. Each SUPL POS message sent by the H-SLP or SET may contain one or more messages for the LPP, LPP/LPPe or TIA-801 positioning protocols. For example, in some embodiments, SLP 801 may determine these message using processor 811 and send and receive them using a transmitter, receiver, and antenna (not shown in FIG. 8). For example, the SET 712 may send and receive these messages using Antenna(s) 728. In some embodiments each positioning protocol message sent by the H-SLP may (i) transfer assistance data and/or (ii) request and/or transfer positioning capabilities and/or (iii) request location information. Further, in some embodiments, each positioning protocol message sent by the SET may (i) request assistance data and/or (ii) request and/or transfer positioning capabilities and/or (iii) transfer location information (e.g. location measurements or a location estimate). These contents of positioning protocol messages may be related to particular position methods (e.g. AGPS, AFLT, OTDOA, ECID) supported by the positioning protocol and by the SET and/or H-SLP. The positioning methods used for this session may be determined based on the positioning capabilities exchanged by the SET and the H-SLP during the SUPL POS message exchange or optionally on positioning capabilities transferred within positioning protocol messages by the SET in stage 408 above. The H-SLP may calculate a position estimate for the SET based on the received positioning measurements (SET-Assisted) or the SET may calculate the position estimate based on assistance obtained from the H-SLP (SET-Based) and transfer the position estimate to the H-SLP.

Then at stage 412, the H-SLP determines that a D-SLP (e.g. a D-SLP 130b in FIG. 1) may be able to obtain a better location for the SET. For example, in some embodiments, SLP 801 may make this determination using processor 811. Stage 412 may occur either before or after stage 410. In the former case, stage 410 may not occur. The H-SLP sends a SUPL REDIRECT message to the SET and may include the address of an authorized D-SLP (e.g. a D-SLP 130b in FIG. 1), a billing code and/or digitally signed authentication data. The digitally signed authentication data may include one or more of the billing code, the current date and time, the SET identity and the H-SLP identity. In some embodiments, the H-SLP may determine the need for stage 412 based on one or more of the following:

(a) An indication by the SET in the SUPL POS INIT in stage 408 that the SET supports a SUPL REDIRECT.
(b) A list of authorized D-SLPs provided by the SET in the SUPL POS INIT message in stage 408 and an indication of whether the SET is within the service area of each authorized D-SLP or of any authorized D-SLP.
(c) Prior knowledge by the H-SLP that the SET supports a SUPL REDIRECT (e.g. obtained from a previous SUPL session or determined by the H-SLP operator based on equipment knowledge for the SET or SET user subscription information).
(d) Prior knowledge by the H-SLP that the SET has been assigned authorized D-SLP addresses which may still be valid (e.g. where any time duration limit for a D-SLP may not yet have expired and/or where the SET may be in the geographic service area for a D-SLP).
(e) A recent report from the SET that is has accessed an authorized D-SLP.
(f) A position estimate for the SET obtained in stage 412 that does not satisfy any QoP requested by the SUPL Agent at stage 402.

Next, at stage 414, the SET establishes a separate SUPL session with a D-SLP (e.g. a D-SLP 130b in FIG. 1)—e.g. using the procedure described with regard to FIG. 5 below, and obtains its location. The SET may determine the D-SLP based on any D-SLP included by the H-SLP in the SUPL REDIRECT in stage 412 or the SET may chose a D-SLP based on currently authorized D-SLPs that the SET is allowed to access (e.g. where any service duration for a D-SLP has not expired and where the SET is within any service area for the D-SLP). For example, the SET 712 may establish a separate SUPL session with processor 720 sending and receiving messages using Antenna(s) 728.

Then, at stage 416, the SET returns the position estimate to the H-SLP in a SUPL REPORT message. Alternatively (not shown in FIG. 4), the SET may return the position estimate to the H-SLP in a SUPL END message. For example, the SET 712 may send and receive these messages using Antenna(s) 728.

Next, at stage 418, if the SET did not send a SUPL END in stage 416, the H-SLP may send a SUPL END message to the SET indicating that the location session has ended. The SET will then release the TLS connection to the H-SLP and release all resources related to this session. For example, the SET 712 may send and receive these messages using Antenna(s) 728.

At stage 420, the H-SLP sends the position estimate (posresult) back to the SUPL Agent in an MLP SLIA message and the H-SLP releases all resources related to this session. For example, in some embodiments, SLP 801 may determine this message using processor 811 and send it using a transmitter and antenna (not shown in FIG. 8).

In an alternative embodiment to the example described in FIG. 4 above, the H-SLP may transfer a SUPL REINIT message to the SET in stage 404 instead of a SUPL NIT message to initiate a new positioning activity for an already ongoing generic SUPL session with the SET. For example, in some embodiments, SLP 801 may determine this message using processor 811 and send it using a transmitter and antenna (not shown in FIG. 8). For example, the SET 712 may receive these messages using Antenna(s) 728. In this embodiment, for example, stages 402 through 420 may occur as described above for FIG. 4 except that (i) no data connection or TLS session may be set up in stage 406 by the SET if a data connection and TLS session already exist, (ii) a posMethod parameter may not be included in the SUPL REINIT in step 404, (iii) notification rules may not be evaluated by the SET in stage 408, and (iv) stage 418 may be omitted and the generic SUPL session may continue after the SET has returned its location to the H-SLP in stage 416.

In another embodiment of the example described above in FIG. 4, stages 414 and 416 may be omitted and the H-SLP may terminate the SUPL session by sending the SUPL END message in stage 418 either after sending the SUPL REDIRECT in stage 412 or after stage 408 or stage 410 with stage 412 then omitted. For example, in some embodiments, SLP

Figure 8:
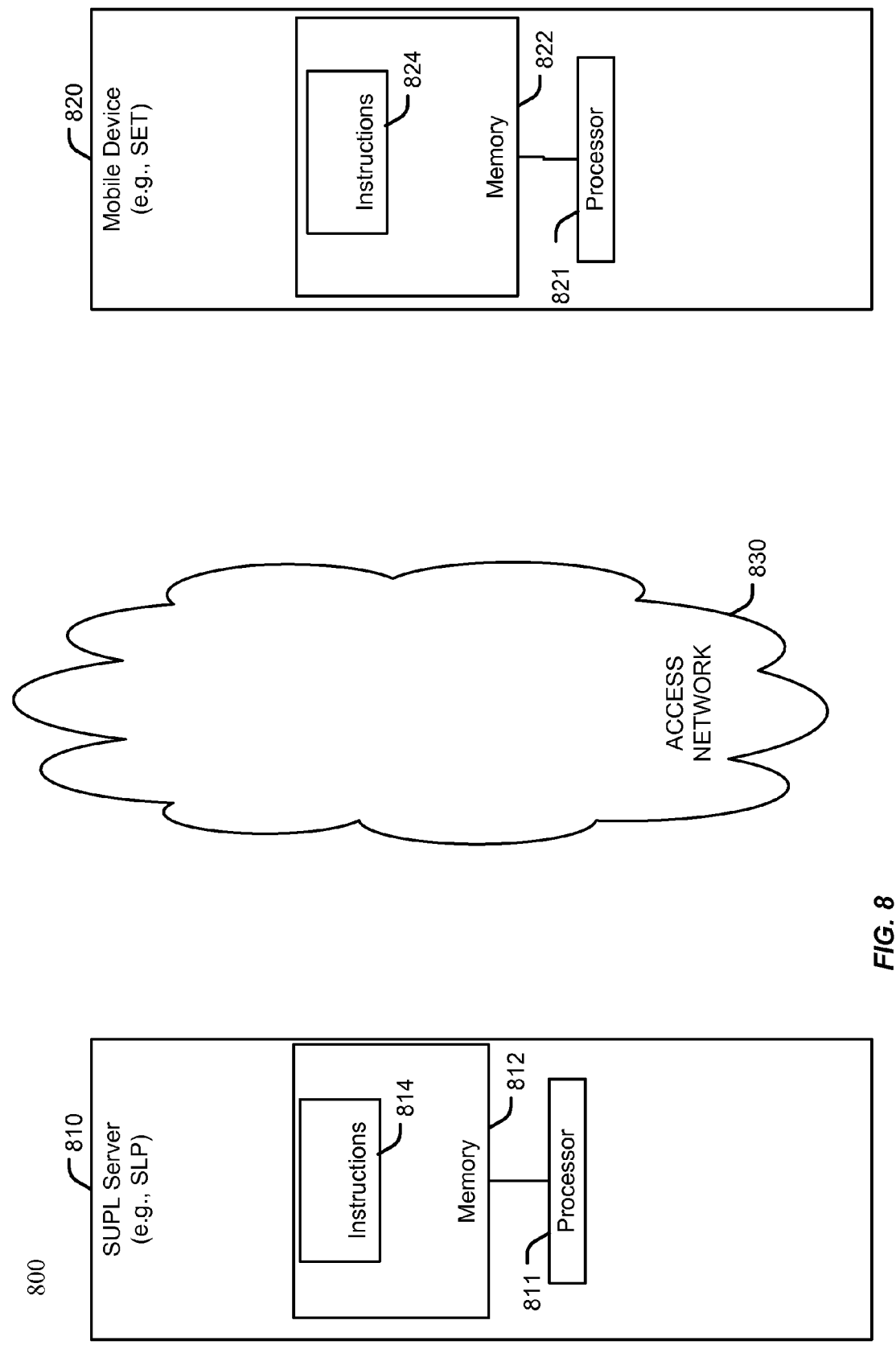
FIG. 8 is a block diagram of a SLP (SUPL Location Platform) in communication with a SET (SUPL Enabled Terminal).

801 may determine this message using processor 811 and send it using a transmitter and antenna (not shown in FIG. 8). For example, the SET 712 may receive the SUPL END message using Antenna(s) 728. In some embodiments, if step 412 is omitted, the H-SLP may include the request to use a D-SLP and the other information described for the SUPL REDIRECT in stage 412 in the SUPL END message sent in stage 418. In this embodiment after the SUPL session in FIG. 4 has been terminated at stage 418, the SET may initiate a SUPL session with a D-SLP—e.g. a D-SLP indicated by the H-SLP in the SUPL REDIRECT in stage 412 or the SUPL END in stage 418 or a D-SLP determined by the SET. The SET may then obtain its location—e.g. using the procedure described below in FIG. 5. After the SET obtains its location, the SET may transfer the location to the H-SLP by instigating a new SUPL session with the H-SLP and the H-SLP may transfer the location to the SUPL Agent according to stage 420 in FIG. 4. The SET may also transfer other information to the H-SLP when instigating the new SUPL session with the H-SLP (e.g. a billing code or other information received from the H-SLP in stage 412) to indicate to the H-SLP that the new SUPL session is related to the SUPL session in FIG. 4.

In another embodiment, after the SET obtains its location from a SUPL session with a D-SLP (e.g. using the procedure in FIG. 5), the SET may transfer the location directly to the SUPL Agent used in FIG. 4—e.g. if the H-SLP provides the identity of the SUPL Agent to the SET in the SUPL REDIRECT message sent in stage 412 of FIG. 4 and optionally additional information to enable the SET to indicate to the SUPL Agent that the location being provided is associated with the location request in the procedure in FIG. 4. For example, in such an embodiment, the SET 712 may send and receive these messages using Antenna(s) 728.

Figure 5:
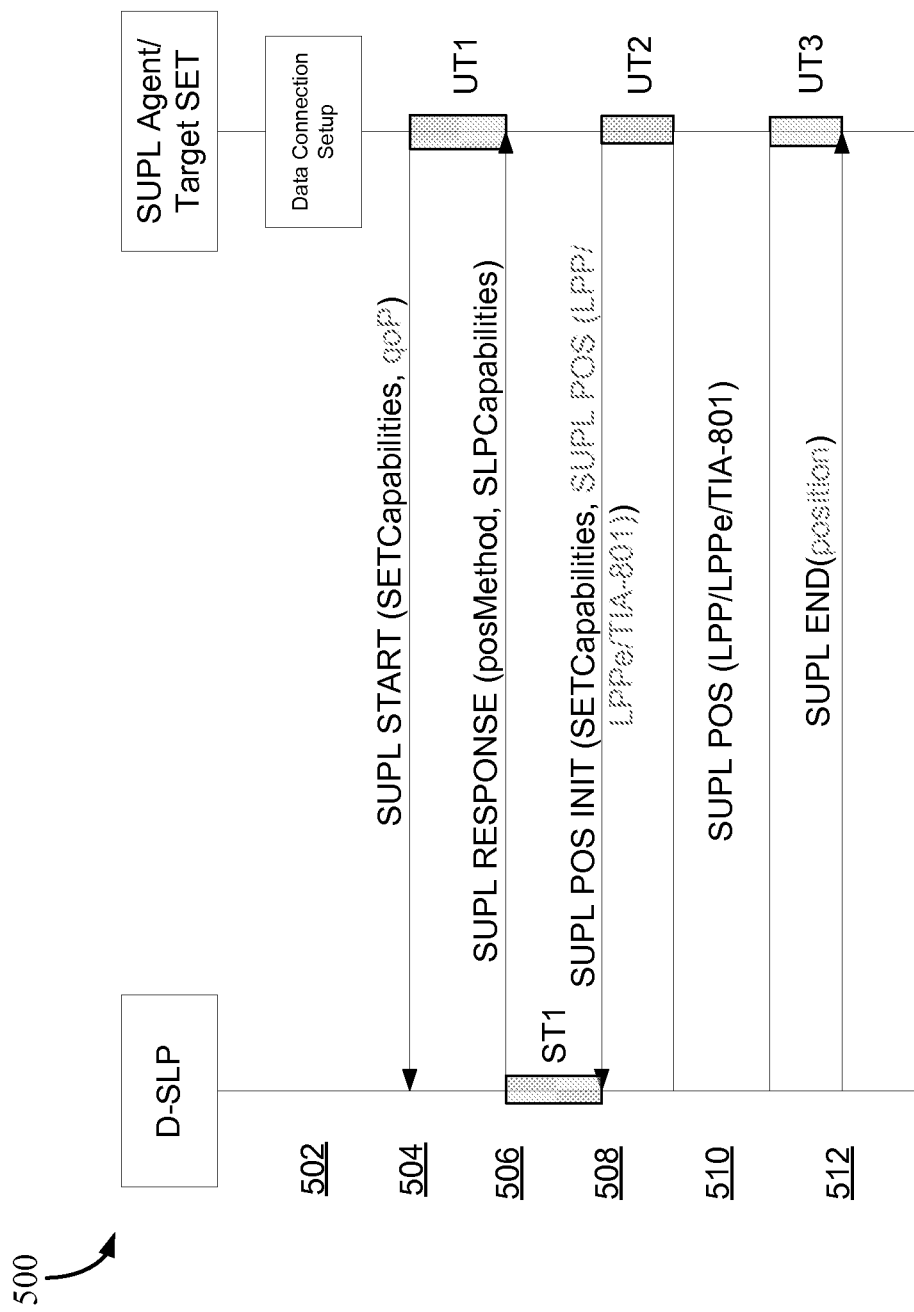
FIG. 5 is a flow diagram describing an example of a method for SET Initiated Location with a D-SLP.

FIG. 5 is a flow diagram describing an example of a method for SET Initiated Location with a D-SLP. The example may be used in stage 414 of FIG. 4. In some embodiments, the stages in FIG. 5 may be implemented in program code that is executed by a processor, for example, the processor in a general purpose computer, mobile device, or server. In some embodiments, these stages may be implemented by a group of processors, for example, a processor on a mobile device and processors on one or more general purpose computers, such as servers. For example, in some embodiments the steps in FIG. 5 may be performed by Processor 720, Memory 722, Software 724, Antenna(s) 728, and I/O Devices 726 of SET 712. In some embodiments, some of the steps may be performed by Processor 811 executing instructions 814 stored on memory 812 of one or more SUPL Servers 810 and using one or more transmitters, receivers, and antennas of one or more SUPL Servers 810 (not shown in FIG. 8).

As shown in FIG. 5, the method 500 starts at stage 502, when the SET (e.g. SET 104 in FIG. 1) receives a position request from a SUPL Agent (e.g., an application) on the SET or from the H-SLP—e.g. as described in FIG. 4 above in relation to stage 414. For example, in some embodiments, SLP 801 may determine this message using processor 811 and send it using a transmitter and antenna (not shown in FIG. 8). For example, SET 712 may receive the request using Antenna(s) 728. The SET takes appropriate action to establish a secure TLS connection to an authorized D-SLP (e.g. a D-SLP 130b in FIG. 1). For example, the D-SLP may be the D-SLP indicated by the H-SLP in the SUPL REDIRECT at stage 412 in FIG. 4 above or may be the D-SLP determined by the SET for stage 414 in FIG. 4 above. The SET and the D-SLP may authenticate one another during the establishment of the TLS connection in stage 502.

Next, at stage 504, the SET establishes a secure TLS connection to the D-SLP and sends a SUPL START message to start a positioning session with the D-SLP. The SUPL START message contains the SET capabilities (sETCapabilities) and optionally the desired QoP. For example, SET 712 may establish the TLS connection using Antenna(s) 728 and processor 720. The QoP may be the QoP received in the SUPL INIT in stage 404 in FIG. 4 above. The SUPL START may also include any billing code and/or digitally signed authentication data received from the H-SLP as described in stage 412 of FIG. 4 above. The D-SLP may use the digitally signed authentication data to authenticate the identity of the SET and/or the identity of the H-SLP.

In some embodiments, if a previously computed position that meets the requested QoP is available at the D-SLP, the D-SLP will proceed directly to stage 512 and send a SUPL END message to the SET including the position result (position). For example, SET 712 may receive the SUPL END using Antenna(s) 728

Then, at stage 506, the D-SLP sends a SUPL RESPONSE message to the SET. In some embodiments, the SUPL RESPONSE contains the intended positioning method (posMethod) and the D-SLP Capabilities (sLPCapabilities). For example, SET 712 may receive the SUPL RESPONSE using Antenna(s) 728

Next, at stage 508, the SET sends a SUPL POS INIT message to the D-SLP. For example, SET 712 may send the SUPL POS INIT using Antenna(s) 728. In some embodiments, the SET sends the SUPL POS INIT message even if the SET does not support the intended positioning method indicated in SUPL RESPONSE. The SUPL POS INIT message contains the SET capabilities (sETCapabilities). In some embodiments, the SUPL POS INIT message may also contain a SUPL POS message carrying LPP/LPPe and/or TIA-801 positioning protocol messages in line with the D-SLP's positioning protocol capabilities (indicated in stage 506 in sLPCapabilities). In some embodiments, the SET may also provide its position, if this is supported (as part of LPP/LPPe/TIA-801 or explicitly through the optional position parameter in the SUPL POS INIT message). In some embodiments, if a position retrieved in, or calculated based on information received in the SUPL POS INIT message is available that meets the required QoP, the D-SLP may proceed to stage 512 and not engage in a SUPL POS session.

Then, at stage 510, the SET and D-SLP engage in a SUPL POS message exchange to calculate a position. For example, SET 712 may send and receive these messages using Antenna(s) 728. Each SUPL POS message sent by the D-SLP or SET may contain one or more messages for the LPP, LPP/LPPe or TIA-801 positioning protocols. Each positioning protocol message sent by the D-SLP may (i) transfer assistance data and/or (ii) request and/or transfer positioning capabilities and/or (iii) request location information. Each positioning protocol message sent by the SET may (i) request assistance data and/or (ii) request and/or transfer positioning capabilities and/or (iii) transfer location information (e.g. location measurements or a location estimate). These contents of positioning protocol messages may be related to particular position methods (e.g. AGPS, AFLT, OTDOA, ECID) supported by the positioning protocol and by the SET and/or D-SLP. The positioning methods used for this session may be determined based on the positioning capabilities exchanged by the SET and the D-SLP during the SUPL POS message exchange. In some embodiments, these positioning capabilities may have been transferred by the SET in positioning protocol messages sent in stage 508. The D-SLP may calculate the position estimate for the SET based on the received positioning measurements (SET-Assisted) or the SET may calculate the position estimate based on assistance obtained from the D-SLP (SET-Based).

At stage 512, in some embodiments, once the position calculation is complete, the D-SLP sends a SUPL END message to the SET indicating that the location session has ended. For example, SET 712 may receive these messages using Antenna(s) 728. In some embodiments, the D-SLP may also send the position result (position) in SUPL END—e.g. if the D-SLP rather than the SET calculated the position estimate in stage 510. In other embodiments, the SET may have obtained the position result itself—e.g. by making use of assistance data received from the D-SLP at stage 510. In some embodiments, the SET will release the TLS connection to the D-SLP and release all resources related to this session. In some embodiments, the D-SLP will release all resources related to this session. The D-SLP or the D-SLP operator may transfer any billing code received in stage 504 to the H-SLP or the H-SLP operator (not shown in FIG. 5) to bill the H-SLP operator for the location service provided to the SET by the procedure 500. The H-SLP or H-SLP operator may recognize the billing code as having been transferred to the SET in stage 412 of FIG. 4 and may bill the SUPL Agent in FIG. 4 and not the SET for the location service provided in FIG. 5.

Figure 6:
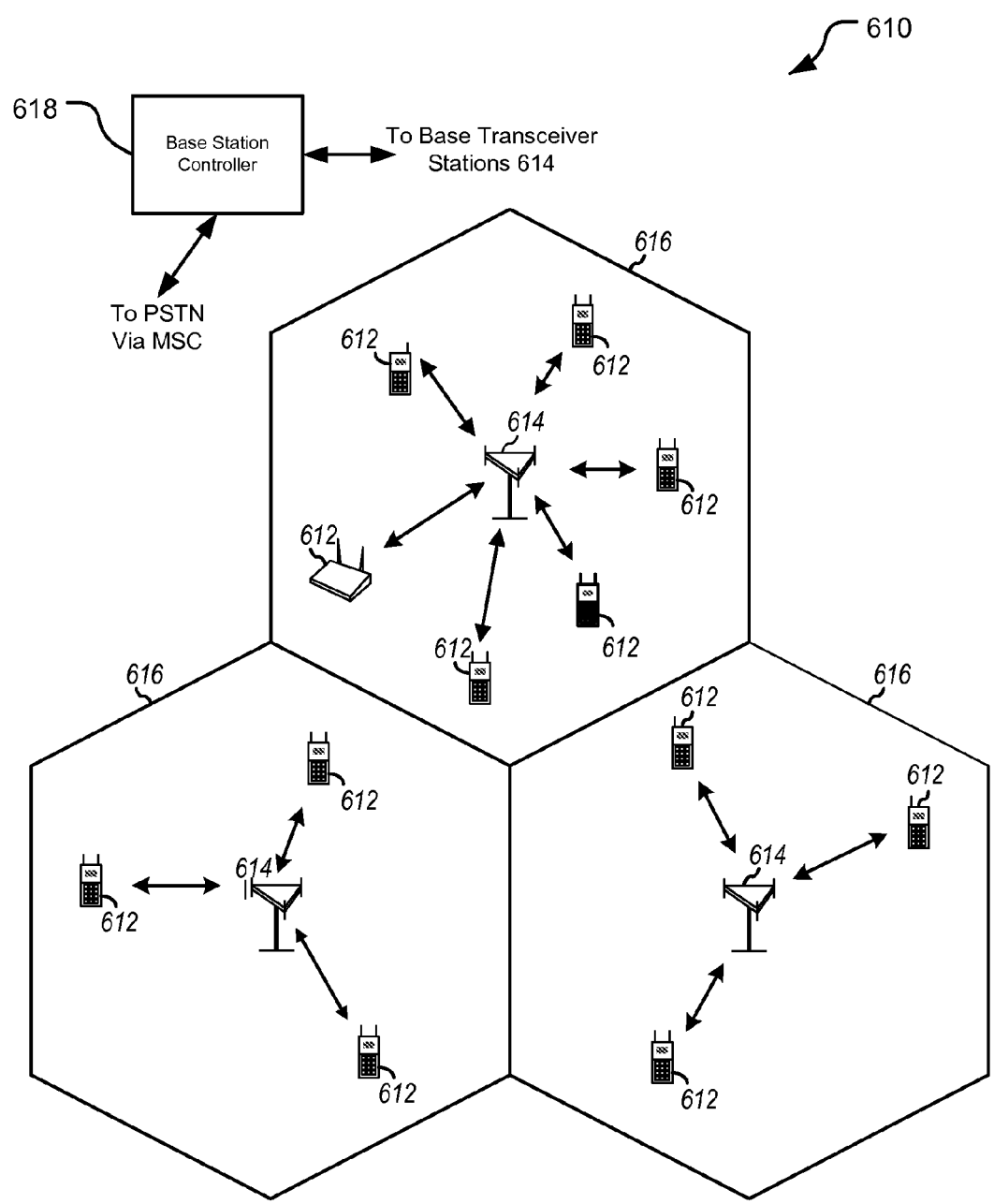
FIG. 6 is a schematic diagram of a wireless telecommunication system.

Referring to FIG. 6, a wireless communication system 610 includes various devices, such as user equipment 612 (UE), base transceiver stations (BTSs) 614 disposed in cells 616, and a base station controller (BSC) 618. A UE 612 may be an example of SET 104 in FIG. 1 and BSC 618 and BTSs 614 may be part of visited/serving network 102a and/or home network 102b in FIG. 1. The system 610 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 614 can wirelessly communicate with the UEs 612 via antennas. Each of the BTSs 614 may also be referred to as a base station, an access point, an access node (AN), a Node B, an evolved Node B (eNB), etc. The BTSs 614 are configured to communicate with the UEs 612 under the control of the BSC 618 via multiple carriers. Each of the BTSs 614 can provide communication coverage for a respective geographic area, here the respective cells 616. Each of the cells 616 of the BTSs 614 is partitioned into multiple sectors as a function of the base station antennas.

The system 610 may include only macro base stations 614 or it can have base stations 614 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The UEs 612 can be dispersed throughout the cells 616. The UEs 612 may be referred to as terminals, mobile stations, mobile devices, user equipment (UE), subscriber units, etc. Each UE may comprise a SET (SUPL Enabled Terminal), as discussed above. The UEs 612 shown in FIG. 6 may include mobile telephones, personal digital assistants (PDAs) and vehicular navigation and/or communication systems, but may also include wireless routers, other handheld devices, netbooks, notebook computers, etc.

Figure 7:
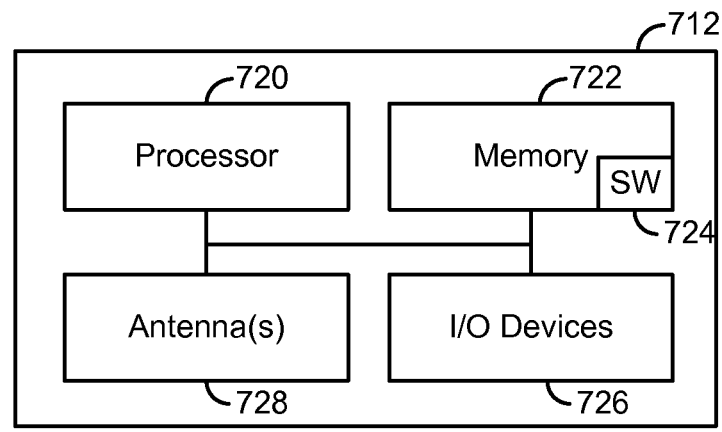
FIG. 7 is a block diagram of components of a mobile device shown in FIG. 6.

Referring also to FIG. 7, an example 712 of one of the UEs 612 in FIG. 6 (e.g. a UE that comprises a SET 104 in FIG. 1) comprises a computer system including a processor 720, memory 722 including software 724, input/output (I/O) device(s) 726 (e.g., a display, speaker, keypad, touch screen or touchpad, etc.) and one or more antennas 728. The antenna(s) 728 provide communication functionality for the UE 712 and facilitates bi-directional communication with the BTSs 614 in FIG. 6. The antennas may also enable reception and measurement of SPS signals—e.g. signals from GPS satellite 150 in FIG. 1. The antenna(s) 728 can operate based on instructions from a transmitter and/or receiver module, which can be implemented via the processor 720 (e.g., based on software 724 stored on memory 722) and/or by other components of the UE 712 in hardware, software, or a combination of hardware and/or software.

The processor 720 is an intelligent hardware device, e.g., a central processing unit (CPU) such as those made by Intel® Corporation or AMD®, a microcontroller, an application specific integrated circuit (ASIC), etc. The memory 722 includes non-transitory storage media such as random access memory (RAM) and read-only memory (ROM). The memory 722 stores the software 724 which is computer-readable, computer-executable software code containing instructions that are configured to, when executed, cause the processor 720 to perform various functions described herein. Alternatively, the software 724 may not be directly executable by the processor 720 but is configured to cause the computer, e.g., when compiled and executed, to perform the functions.

Referring to FIG. 8, a particular embodiment of a system that is operable to perform SUPL redirection or MLP tunneling to a discovered SLP is shown and generally designated 800. The system 800 includes a SUPL server 810 communicably coupled to a mobile device 820 via one or more access networks (e.g., an illustrative access network 830) and possibly also via one or more transit networks (not shown in FIG. 8). SUPL server may comprise one or more transmitters, receivers, and antennas known in the art (not shown in FIG. 8). In a particular embodiment, the SUPL server 810 may be a SUPL location platform (SLP) and the mobile device 820 may be a SUPL-enabled terminal (SET). The access network 830 may be a 3GPP network, a 3GPP2 network, a WiMAX network, a Wi-Fi network (e.g., a network that operates in accordance with an IEEE 802.11 standard), or some other wireless access network. In a particular embodiment, the mobile device 820 may be a wireless telephone.

The SUPL server 810 may include a processor 811 and a memory 812 coupled to the processor 811. In a particular embodiment, the memory 812 may store instructions 814 executable by the processor 811, where the instructions represent various logical modules, components, and applications. For example, the memory 812 may store computer-readable, computer-executable software code containing instructions that are configured to, when executed, cause the processor 811 to perform various functions described herein. The memory 812 may also store one or more security credentials of the SUPL server 810.

The mobile device 820 may include a processor 821 and a memory 822 coupled to the processor 821. For example, the processor 821 and memory 822 may comprise processor 720 and memory 722 of SET 712, and described with regard to FIG. 7. In a particular embodiment, the memory 822 stores instructions 824 executable by the processor 821, where the instructions may represent various logical modules, components, and applications. For example instructions 824 may comprise software 724 of SET 712, and described with regard to FIG. 7. For example, the memory 822 may store computer-readable, computer-executable software code containing instructions that are configured to, when executed, cause the processor 811 to perform various functions described herein. The memory 822 may also store one or more security credentials of the mobile device 820.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for processing a Mobile Location Protocol ("MLP") request, the method comprising:
   receiving, at a Home Secure User Plane Location ("SUPL") Location Platform ("H-SLP"), an MLP request to locate a SUPL Enabled Terminal ("SET");
   determining to utilize a first Discovered SLP ("D-SLP") to locate the SET;
   transmitting the MLP request from the H-SLP to the first D-SLP; and
   tunneling the MLP request from the first D-SLP to a second D-SLP.

2. The method of claim 1, wherein transmitting the MLP request from the H-SLP to the first D-SLP comprises tunneling the MLP request from the H-SLP to the first D-SLP.

3. The method of claim 1, wherein determining to utilize the first D-SLP to locate the SET comprises determining that the first D-SLP will be better able to locate the SET than the H-SLP.

4. The method of claim 1, wherein a network initiated Secure User Plane Location ("SUPL") session is instigated by the second D-SLP with the SET.

5. The method of claim 4, wherein the location of the SET is determined by the SET.

6. The method of claim 1, wherein a network initiated SUPL session is instigated by the first D-SLP with the SET.

7. The method of claim 6, wherein the location of the SET is determined by the SET.

8. The method of claim 1, wherein the SET comprises a mobile device.

9. A system for processing a Mobile Location Protocol ("MLP") request, the system comprising:
 a Secure User Plane Location ("SUPL") Location Platform ("SLP") comprising:
  a receiver configured to receive an MLP request to locate a SUPL Enabled Terminal ("SET");
  a processor configured to:
   determine to utilize a first Discovered SLP ("D-SLP") to locate the SET; and
  a transmitter configured to transmit the MLP request to the first D-SLP,
  wherein the first D-SLP is configured to tunnel the MLP request to a second D-SLP.

10. The system of claim 9, wherein the transmitter is configured to tunnel the MLP request from the SLP to the first D-SLP.

11. The system of claim 9, wherein the processor is configured to determine to utilize the first D-SLP to locate the SET when the first D-SLP will be better able to locate the SET than the SLP.

12. The system of claim 9, wherein the SET comprises a mobile device.

13. A system for Mobile Location Protocol ("MLP") tunneling comprising:
 a Secure User Plane Location ("SUPL") Location Platform ("SLP") comprising:
  means for receiving an MLP request to locate a SUPL Enabled Terminal ("SET");
  means for determining to utilize a first Discovered SLP ("D-SLP") to locate the SET; and
  means for transmitting the MLP request to the first D-SLP, wherein the first D-SLP is configured to tunnel the MLP request to a second D-SLP.

14. The system of claim 13, wherein transmitting the MLP request from a Home SUPL Location Platform ("H-SLP") to the first D-SLP comprises tunneling the MLP request from the H-SLP to the first D-SLP.

15. The system of claim 13, wherein determining to utilize the first D-SLP to locate the SET comprises determining that the first D-SLP will be better able to locate the SET than the H-SLP.

16. A non-transitory computer readable medium having stored thereon computer implementable instructions that if implemented by one or more processing units operatively enable the one or more processing units to:
 receive a Mobile Location Protocol ("MLP") request at a Home Secure User Plane Location ("SUPL") Location Platform ("H-SLP") to locate a SUPL Enabled Terminal ("SET");
 determine to utilize a first Discovered SLP ("D-SLP") to locate the SET; and
 transmit the MLP request to the first D-SLP, wherein the first D-SLP is configured to tunnel the MLP request to a second D-SLP.

17. The non-transitory computer readable medium of claim 16, wherein transmitting the MLP request from the H-SLP to the first D-SLP comprises tunneling the MLP request from the H-SLP to the first D-SLP.

18. The non-transitory computer readable medium of claim 16, wherein determining to utilize the first D-SLP to locate the SET comprises determining that the first D-SLP will be better able to locate the SET than the H-SLP.

* * * * *